United States Patent
Bertolini et al.

(10) Patent No.: US 12,222,007 B2
(45) Date of Patent: Feb. 11, 2025

(54) BEARING UNIT WITH SENSORIZED SHIELD

(71) Applicant: AKTIEBOLAGET SKF, Gothenburg (SE)

(72) Inventors: Andrea A. Bertolini, Carrara (IT); Fausto Baracca, Massa (IT); Fabio Cavacece, Rome (IT); Pasquale Frezza, Aversa (IT); Alessio Nebbia Colomba, Pisa (IT)

(73) Assignee: AKTIEBOLAGET SKF (SE)

( * ) Notice: Subject to any disclaimer, the term of this patent is extended or adjusted under 35 U.S.C. 154(b) by 58 days.

(21) Appl. No.: 17/988,905

(22) Filed: Nov. 17, 2022

(65) Prior Publication Data
US 2023/0160422 A1    May 25, 2023

(30) Foreign Application Priority Data
Nov. 24, 2021 (IT) .......................... 102021000029612

(51) Int. Cl.
*F16C 33/78* (2006.01)
*F16C 19/06* (2006.01)

(52) U.S. Cl.
CPC .......... *F16C 33/7846* (2013.01); *F16C 19/06* (2013.01); *F16C 2233/00* (2013.01); *F16C 2240/60* (2013.01)

(58) Field of Classification Search
CPC ............... F16C 33/784; F16C 33/7843; F16C 33/7846; F16C 33/785; F16C 41/008; F16C 2233/00
See application file for complete search history.

(56) References Cited

U.S. PATENT DOCUMENTS 3,206,262 A * 9/1965 Haag .................... F16C 33/7853
                                                    277/577
10,408,269 B2 * 9/2019 Okamura ................ F16C 19/06
(Continued)

FOREIGN PATENT DOCUMENTS

EP    2042757    4/2009
GB    2534419    7/2016
(Continued)

OTHER PUBLICATIONS

Search Report for corresponding Italy Patent Application No. 102021000029612 dated Jun. 30, 2022.

*Primary Examiner* — James Pilkington
(74) *Attorney, Agent, or Firm* — Reed Smith LLP

(57) ABSTRACT

A bearing unit for a marble cutting machine has a radially outer ring, rotatable with respect to an axis of rotation (X) and is provided with a radially outer flange portion. Additionally, the bearing unit is provided with a stationary radially inner ring with a through hole in which the ratio between a dimension of an internal diameter (D) of the through hole and a dimension of the axial thickness (T) of the radially inner ring is between about 6.7 and about 11.1. A row of rolling bodies is interposed between the radially outer ring and the radially inner ring. A sealing shield is made of composite material and interposed between the radially inner ring and the radially outer ring, rotatable with respect to the rotation axis (X) and steadily anchored to the radially outer ring. The shield is provided with a sensor molded in it.

8 Claims, 3 Drawing Sheets

(56) References Cited

U.S. PATENT DOCUMENTS

| | | |
|---|---|---|
| 10,465,799 B2 | 11/2019 | Takimoto |
| 2009/0136167 A1* | 5/2009 | Morita .................. G01K 13/08 |
| | | 384/448 |
| 2016/0146256 A1 | 5/2016 | Berens et al. |
| 2021/0010540 A1 | 1/2021 | Baracca et al. |
| 2023/0043890 A1 | 2/2023 | Bertolini et al. |
| 2023/0160430 A1 | 5/2023 | Bertolini et al. |

FOREIGN PATENT DOCUMENTS

| | | | |
|---|---|---|---|
| GB | 2540564 | 1/2017 | |
| JP | H10252749 | 9/1998 | |
| WO | WO-2012098980 A1 * | 7/2012 | ............ F16C 19/525 |

\* cited by examiner

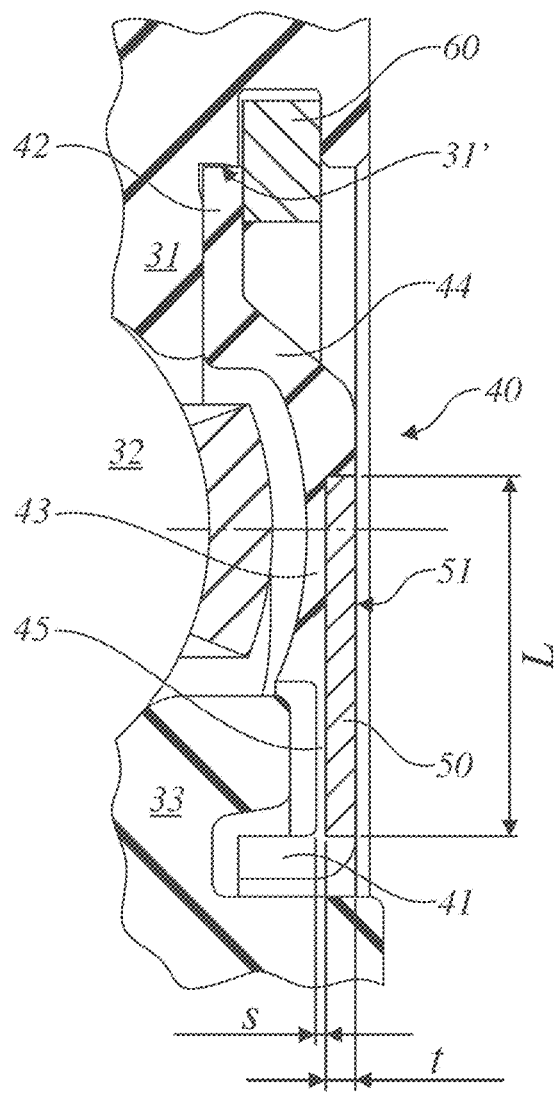
Fig. 3
Detail A
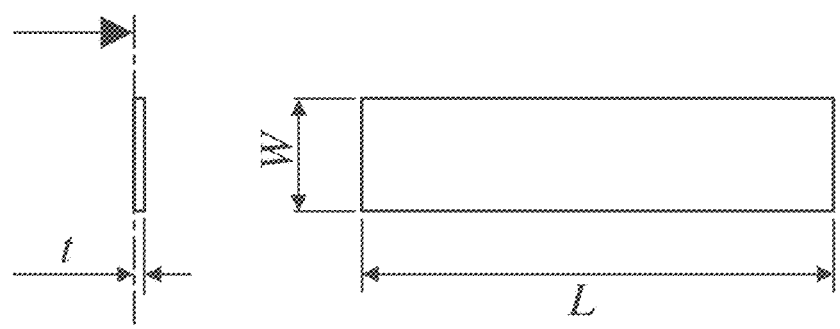
Fig. 4a
Fig. 4b

BEARING UNIT WITH SENSORIZED SHIELD

CROSS-REFERENCE TO RELATED APPLICATIONS

This application is based on and claims priority to Italian Patent Application No. 102021000029612 filed on Nov. 24, 2021, under 35 U.S.C. § 119, the disclosure of which is incorporated by reference herein.

FIELD

The present disclosure relates to a bearing unit provided with a sensorized shield. Such a bearing unit is suitable for applications in the manufacturing sector and especially in the marble cutting industry.

BACKGROUND

A bearing unit typically has a first component, for example a rotating ring, which is fixed to a rotating element and a second component, for example a stationary ring, which is fixed to a stationary element. In rolling bearing units, the rotation of one ring with respect to the other is allowed by a plurality of rolling bodies that are positioned between the cylindrical surface of one component and the cylindrical surface of the second component.

Bearing units typically have sealing devices for protection against external contaminants and for sealing with respect to the lubricant.

In the manufacturing industry, and especially in applications in the marble cutting industry, bearing units of the known type typically have very restricted axial dimensions, since they are mounted axially adjacent to each other, forming a "pack" of bearing units, and this dimensional limit makes it necessary to use technical solutions that are particularly complex or even costly in terms of the choice of their components, which, while having small overall axial dimensions, must still have a high level of performance.

In the context described above, therefore, the bearing unit typically has a first component, for example a radially outer ring, which is fixed to a rotating element (a typical rotation speed in the marble industry is around 750 r.p.m.), and a second component, for example a radially inner ring, which is fixed to a stationary element. It is frequently the case that the radially inner ring is rotatable and the radially outer ring is stationary, but in other applications, such as that described, it is the outer ring that rotates while the inner ring is stationary. In any case, in rolling bearing units, the rotation of one ring with respect to the other is allowed by a plurality of rolling bodies that are positioned between the cylindrical surface of one component and the cylindrical surface of the second component, these surfaces being called raceways. The rolling bodies may be balls, cylindrical or tapered rollers, needle rollers, or similar rolling bodies.

Bearing units typically have sealing devices for protection against external contaminants and for sealing with respect to the lubricant. The sealing devices may have a shaped shield interference fitted in a seat in the rings of the bearing unit, in the radially outer ring for example, and may be made of metallic material, plastic material, for example PTFE, or composite material.

The bearing units of marble cutting machines are subjected to high temperatures. The bearing units are assembled in "pack" form, which may make it difficult to dissipate the heat produced by the rolling friction generated during the relative rotation of the rings of the bearing unit. Heat dissipation is even more difficult in the innermost bearing units of the bearing unit pack, since these central units are more isolated from the external environment.

Users of marble cutting machines must not allow their machines to run at more than 110° C., and must therefore control the temperature. Considerable volumes of cooling water are used for this purpose, in order to remove the greatest possible amount of heat, but it is difficult to determine the exact volume or the correct temperature of the water that would reduce to a minimum the amount of water used to keep the machine temperature under control.

BRIEF DESCRIPTION OF THE DRAWINGS

The disclosure will now be described with reference to the attached drawings, which show exemplary embodiments of the bearing unit, in which:

FIG. 3 is an enlarged cross-sectional view of, a detail of the bearing unit of FIG. 2;

FIGS. 4*a* and 4*b* show, in two orthogonal views, a sensor of the bearing unit of FIG. 2.

DETAILED DESCRIPTION

Figure 1:
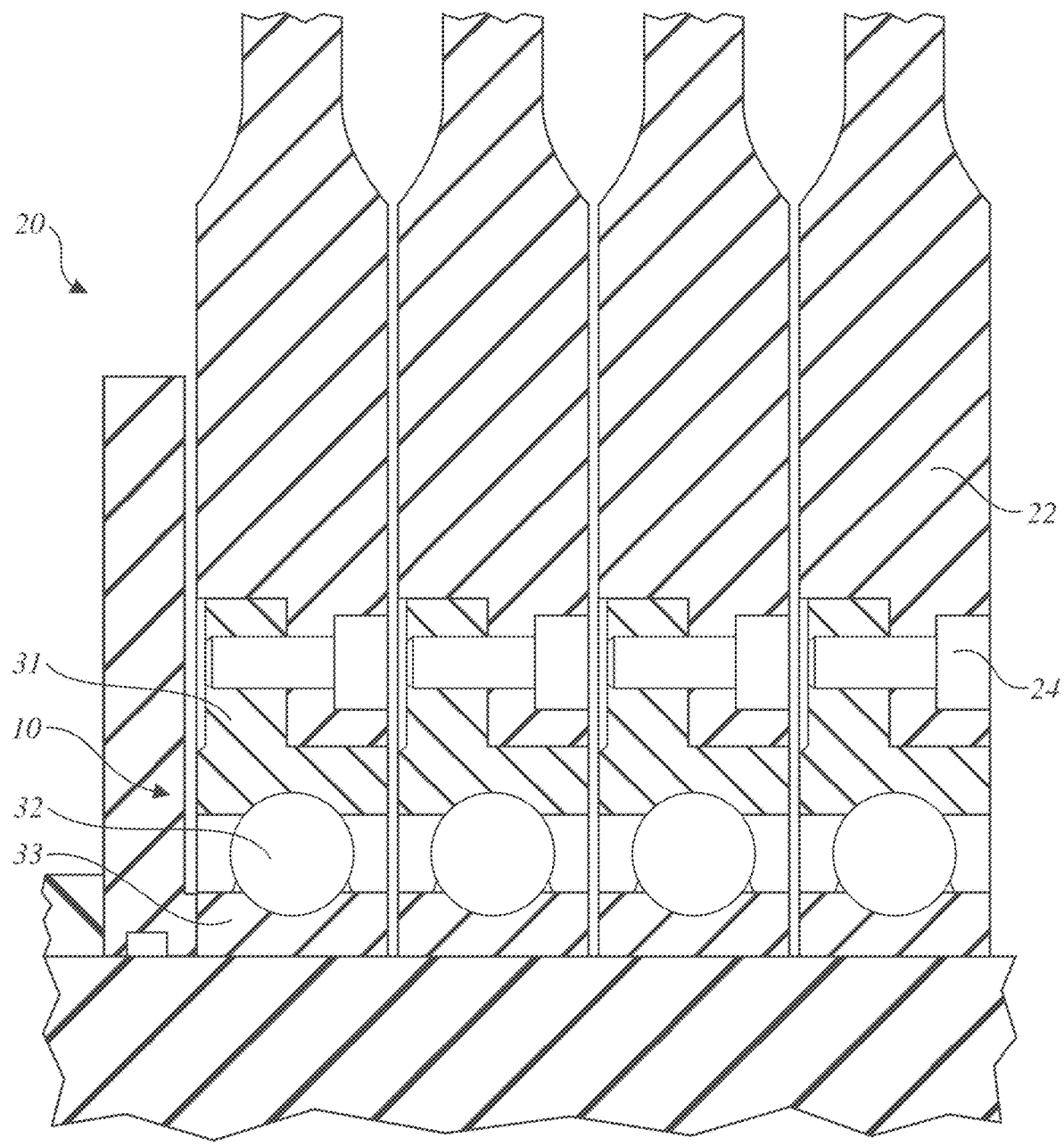
FIG. 1 is a partial schematic view of an assembly of bearing units for a marble cutting machine according to exemplary embodiments of this disclosure.

In the manufacturing industry, and especially in applications in the marble cutting industry, bearing units of the known type typically have very restricted axial dimensions, since they are mounted axially adjacent to each other, forming a "pack" of bearing units, and this dimensional limit makes it necessary to use technical solutions that are particularly complex or even costly in terms of the choice of their components, which, while having small overall axial dimensions, must still have a high level of performance.

In the context described above, therefore, the bearing unit typically has a first component, for example a radially outer ring, which is fixed to a rotating element (a typical rotation speed in the marble industry is around 750 r.p.m.), and a second component, for example a radially inner ring, which is fixed to a stationary element. It is frequently the case that the radially inner ring is rotatable and the radially outer ring is stationary, but in other applications, such as that described, it is the outer ring that rotates while the inner ring is stationary. In any case, in rolling bearing units, the rotation of one ring with respect to the other is allowed by a plurality of rolling bodies that are positioned between the cylindrical surface of one component and the cylindrical surface of the second component, these surfaces being called raceways. The rolling bodies may be balls, cylindrical or tapered rollers, needle rollers, or similar rolling bodies.

Bearing units typically have sealing devices for protection against external contaminants and for sealing with respect to the lubricant. The sealing devices may have a shaped shield interference fitted in a seat in the rings of the bearing unit, in the radially outer ring for example, and may be made of metallic material, plastic material, for example PTFE, or composite material.

The bearing units of marble cutting machines are subjected to high temperatures. The bearing units are assembled in "pack" form, which may make it difficult to dissipate the heat produced by the rolling friction generated during the relative rotation of the rings of the bearing unit. Heat dissipation is even more difficult in the innermost bearing units of the bearing unit pack, since these central units are more isolated from the external environment.

Users of marble cutting machines must not allow their machines to run at more than 110° C., and must therefore control the temperature. Considerable volumes of cooling water are used for this purpose, in order to remove the greatest possible amount of heat, but it is difficult to determine the exact volume or the correct temperature of the water that would reduce to a minimum the amount of water used to keep the machine temperature under control.

Various embodiments of this disclosure provide a shield of the sealing device of the bearing unit with a sensor molded therein, such as a temperature sensor, for the purpose of monitoring the temperature level in the bearing unit.

The bearing unit sensorized in this way may be fitted in a median position relative to the bearing unit pack for the purpose of monitoring the highest temperature levels.

The real-time knowledge of the temperature of a bearing unit enables an operator, during the optimization or use of the marble cutting machine, to increase or reduce the flow rate of water within the shaft, allowing for that the amount of heat removed increases as the water flow rate rises. This makes it possible to avoid using the greatest possible amount of water, which would be an uneconomical and inefficient solution in terms of consumption and wastage.

With reference to FIG. 1, a marble cutting machine 20 suitable for producing marble slabs (not illustrated) of highly reduced thickness, in other words a thickness of about 13 mm, is shown schematically with parts removed.

The machine 20 may include a plurality of pulleys 22 (only four of which are shown) for the movement and return of corresponding cutting wires (not illustrated) for cutting the marble.

The pulleys 22 are positioned axially adjacent to each other, and their axial spacing determines the thickness of the marble slabs.

The rotation of each pulley 22 is allowed by a corresponding bearing unit 10.

The bearing unit 10 may include a radially inner ring 33 and a flanged radially outer ring 31, which rotates relative to the inner ring 33 by the interposition of a plurality of rolling bodies 32, and is provided with a radially outer flange 25, to which the corresponding pulley 22 is attached by fasteners 24, preferably in the form of screws.

Each bearing unit 10 may be mounted in close axial contact with the axially adjacent bearing units 10, in order to reduce as far as possible the axial distance between two adjacent cutting wires, and in order to avoid any possible axial play between the bearing units. In particular, the stationary radially inner rings 33 are located in close axial contact and have an axial thickness which is greater than the axial thickness of the radially outer rings 31, which may be rotatable.

Figure 2:
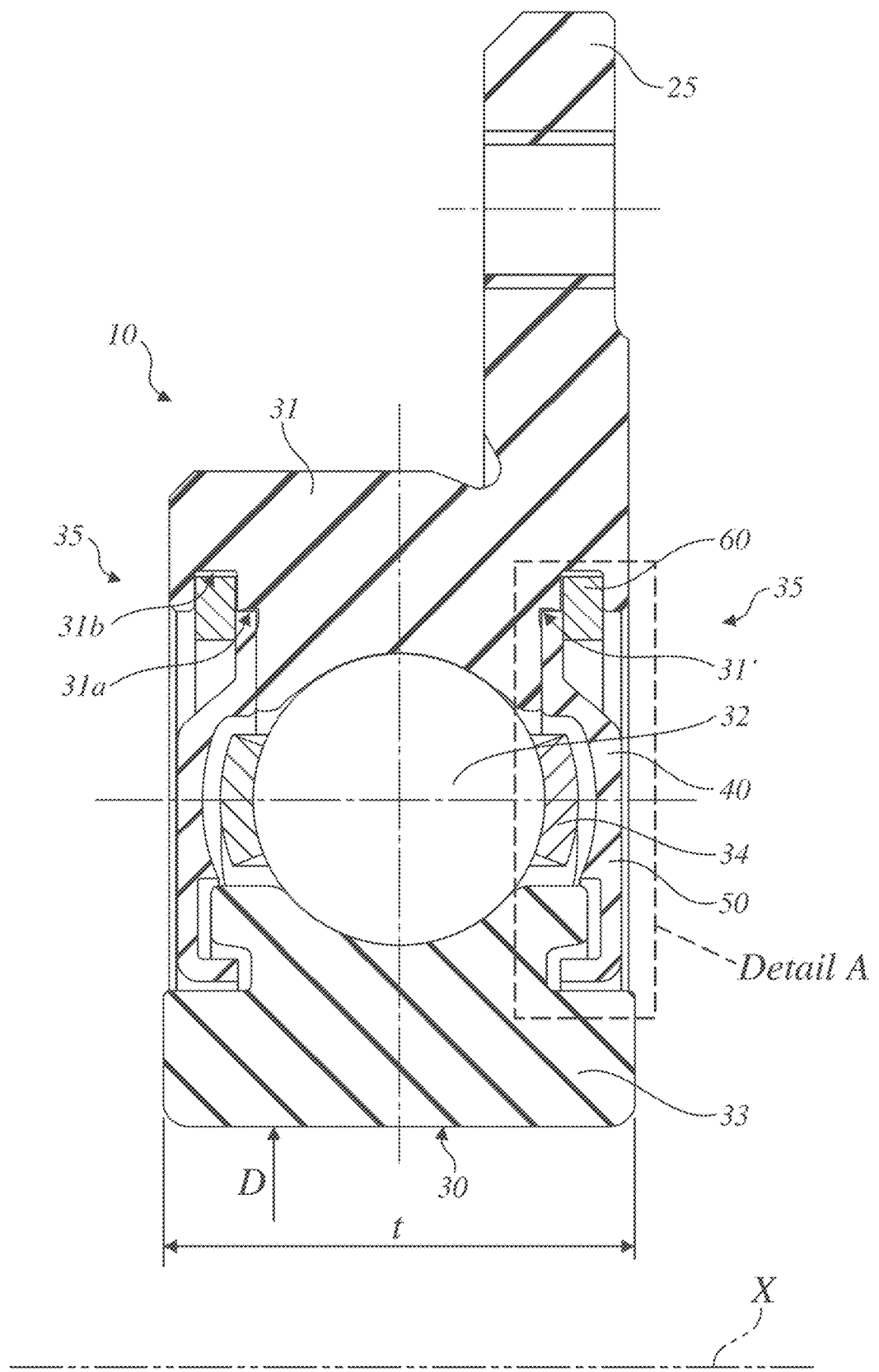
FIG. 2 is a cross-sectional view of a bearing unit according to exemplary embodiments of this disclosure.

With reference to FIG. 2, with the aim of ensuring that the thickness of the marble slabs is greatly reduced, the bearing unit 10 for marble cutting machines may have an axial thickness of itself and of its components, that is to say the radially inner ring 33 and the flanged radially outer ring 31, within the range from about 18 to about 30 mm. Bearing unit 10 may further have an inside diameter D of a through hole 30 in the radially inner ring 33 of at least about 150 mm, or preferably of about 200 mm, so that the ratio between a dimension of the inside diameter D and a dimension of the axial thickness T of the radially inner ring 33 is within a range from about 6.7 to about 11.1. This range ensures, a suitable axial thickness, in combination with a plurality of identical bearing units 10, for obtaining marble slabs of greatly reduced thickness, and, therefore, the provision of parameters of stiffness and strength required for this application. Additionally, in view of the type of cutting operations which produces abrasive dust, of marble and diamond for example, and in view of the cutting operations requiring the use of cooling liquids, essentially water, the bearing unit provides an effective sealing device 35, protecting the bearing unit 10, on each side in order to prevent the ingress of such contaminants into the bearing unit 10, and to give it high strength and a long service life.

In various embodiments, the bearing unit 10 for applications in the marble cutting industry may include a radially outer ring 31, rotatable about a central axis of rotation X of the bearing unit 10, a stationary radially inner ring 33, a row of rolling bodies 32, for example balls, interposed between the radially outer ring 31 and the radially inner ring 33 to allow their relative rotation, a cage 34 for containing the rolling bodies, in order to keep the rolling bodies of the row of rolling bodies 32 in position, and two sealing devices 35 positioned axially on opposite sides of said bearing unit 10 to seal it from the external environment.

Throughout the present description and the claims, terms and expressions indicating positions and orientations such as "radial" and "axial" are to be interpreted as relative to the axis of rotation X of the bearing unit 10.

For simplicity, the reference 32 will be applied both to the individual rolling bodies and to the row of rolling bodies.

The sealing device 35, as shown in FIGS. 2 and 3, is interposed between the radially inner ring 33 and the radially outer ring 31, and may include a shield 40 forming a seal, axially towards the inside, against a support surface 31' of a first seat 31a of the radially outer ring 31. The shield 40 may be stably fixed to the radially outer ring 31, and is consequently rotatable together with it.

The shield 40 may include a cylindrical portion 41, radially internal, which creates a labyrinth seal with the radially inner ring 33; a flange portion 42, radially external, stably fitted on the surface 31' of the radially external ring 31; a substantially annular central portion 43; and a connection portion 44 of frusto-conical shape which connects the flange portion 42 to the central portion 43.

Advantageously, in order to make the best use of the small axial space available for the sealing device, the shield 40 may be made of composite material. By way of example, a type of composite material that could be used is a very hard polyurethane or a POM acetal resin.

The shield 40 may be held in a stable position by an anchoring element 60, for example a snap ring 60 of metallic material. The snap ring 60 is interference fitted into a second seat 31b of the radially outer ring 31, in an axially outer position relative to the first seat 31a, to push the shield 40, particularly its first flange portion 42, axially towards the surface 31' of the outer ring 31.

With reference also to FIGS. 4a and 4b, according to the present disclosure, the shield 40 is provided with a sensor 50 which in exemplary embodiments is a sensor for temperature measurement.

In various embodiments, the sensor 50 may transmit data via radio waves and is a Wi-Fi compatible device. By selecting Wi-Fi technology, it is possible to avoid constructional complications caused by the shield 40 being rotatable, as a result of which using wiring would not be easy to implement. Further exemplary embodiments for transmitting the signal of the sensor 50 include using Bluetooth technology, for example. However, signals according to the Bluetooth standard have a considerably lower range than Wi-Fi signals (usually about 10 m, as against 100 m for a Wi-Fi signal). Another advantage is that a Bluetooth sensor can only connect to one device at a time, but a Wi-Fi sensor allows multiple connections.

The sensor 50 may have a substantially parallelepipedal shape and may be molded in the central portion 43 of the shield 40. The sensor 50 may have a thickness "t" that may vary from about 0.5 mm to about 0.7 mm. This range of thickness allows the sensor to remain within the shield 40 without excessively weakening the shield 40. In exemplary embodiments, the thickness t of the sensor is about 0.6 mm.

For the same reason, in other words for the purpose of remaining within the shield 40 which is of axially symmetric shape, the length L of the sensor may not exceed about 30 mm and the width W may not exceed about 7 mm.

The parallelepipedal shape of the sensor is essentially due to economic considerations: a round sensor that followed the circularity of the shield would be too costly.

The thickness "t" of the sensor 50 is selected in order to leave an annular edge 45 within the central portion 43 of the shield 40 and axially inside it, facing the rolling bodies 32. This annular edge 45 may have a thickness s of not less than about 0.2 mm in order not to adversely affect the rigidity of the shield 40 in the area where the sensor 50 is present. In this arrangement, the sensor 50 will not be completely molded within the shield 40, but will have an axially outer surface 51 that makes it visible to the user.

Preliminary tests have demonstrated the feasibility of the embodiments of this disclosure: a sensor was glued stably to the shield of the bearing unit, and the standard test (at 750 r.p.m. for 8 hours) for checking a new bearing unit design for marble cutting machines was conducted. The outcome of the test was positive, since it allowed the temperature of the shield, and therefore of the bearing unit, to be monitored throughout the duration of the test. The fact that the shield was rotatable (being stably fixed to the radially outer ring) had no effect on the quality of the measurements transmitted by the sensor.

Exemplary embodiments using the sensorized bearing unit have considerable advantages. In the first place, it allows the temperature to be checked: the user may fit a sensorized bearing unit in any specific position (the center of the bearing unit pack, for example). Thus, the temperature of the whole bearing unit pack can be monitored and checked, since the central position is the worst in thermal terms, because it is harder to dissipate the heat generated by the bearing unit. If the temperature is found to be too high, the user may stop the machine or may increase the flow of cooling water without incurring a risk of burning out one or more bearing units. Furthermore, since the user is directly checking the temperature, he can increase the flow rate or reduce the temperature of the incoming water so as to increase the amount of heat that can be dissipated by the water. This improves the performance of the machine and does not require the machine to be stopped.

The manufacturer of the marble cutting machine may supply the end user with a machine that is already optimized with the best flow of cooling water, so as to improve the performance of the machine as far as possible while reducing the temperature of the bearing unit pack.

Various embodiments using a sensorized shield are highly flexible: the bearing unit with the sensorized radially inner ring may be supplied on request together with the system for measuring the temperature, and the user is free to use such sensorized bearing units wherever he considers it necessary. For this purpose, it will be preferable to adopt a clear criterion for distinguishing sensorized shields from shields without sensors, by using different coloring for example.

Because of the way in which the sealing device is designed with the shield attached by an easily removed snap ring, the user may use a standard bearing unit, remove the standard shield, and fit a sensorized shield. This has the advantage of not requiring a custom-made (i.e. sensorized) bearing unit, but simply a sensorized shield, which is evidently cost-saving. Furthermore, the sensorized shield may be used in one or more bearing units placed in different positions, as freely chosen by the user. Moreover, since the sensor has batteries with a life of several years, the user may re-use the sensorized shield even when the bearings are old and have to be replaced.

In addition to the embodiments of the disclosure as described above, it is to be understood that numerous other variants exist. It is also to be understood that said embodiments are provided solely by way of example and do not limit the object of the disclosure or its applications or its possible configurations. On the contrary, although the description given above enables those skilled in the art to implement the present disclosure according to at least one example of its configurations, it is to be understood that numerous variations of the components described may be envisaged without thereby departing from the object of the disclosure as defined in the appended claims, interpreted literally and/or according to their legal equivalents.

We claim:

1. A bearing unit for a marble cutting machine, comprising:
   a radially outer ring comprising a radially outer flange portion, wherein the radially outer ring is rotatable with respect to an axis of rotation (X);
   a radially inner ring comprising a through hole and an axial thickness, wherein a ratio between a dimension of an internal diameter (D) of the through hole and a dimension of the axial thickness (T) of the radially inner ring is between 6.7 and 11.1, wherein the radially inner ring is stationary;
   a row of rolling bodies interposed between the radially outer ring and the radially inner ring;
   a sealing shield interposed between the radially inner ring and the radially outer ring, wherein the sealing shield is fixed to the radially outer ring and rotatable with respect to the rotation axis (X), wherein the sealing shield comprises:
      a radially internal cylindrical portion defining a labyrinth seal with the radially inner ring;
      a radially external flange portion configured to be inserted on a surface of the radially outer ring;
      an annular central portion comprising an axially inner annular edge facing the row of rolling bodies; and
      a connection portion of frusto-conical shape configured to connect the flange portion to the annular central portion,
      wherein each of the radially internal cylindrical portion, the radially external flange portion, the connection portion, and the annular central portion comprising the axially inner annular edge comprise a composite material; and
   a sensor molded in the annular central portion axially outer to the axially inner annular edge.

2. The bearing unit of claim 1, wherein the sensor is a sensor for measuring temperature and transmits data via radio waves.

3. The bearing unit of claim 1, wherein the sensor comprises a substantially parallelepiped shape and is molded in a central portion of the sealing shield.

4. The bearing unit of claim 3, wherein the sensor comprises a thickness (t) in a range between 0.5 mm and 0.7 mm.

5. The bearing unit of claim 3, wherein a length (L) of the sensor is less than or equal to 30 mm and a width (W) of the sensor is less than or equal to 7 mm.

6. The bearing unit of claim 3, wherein the axially inner annular edge of the annular central portion comprises a thickness(s) of not less than 0.2 mm.

7. The bearing unit of claim 6, wherein the sensor comprises an axially external surface not covered by the sealing shield.

8. The bearing unit of claim 1, wherein the sealing shield is axially sealed against a bearing surface of a first seat of the radially outer ring and is fixed by an anchoring element, inserted by interference in a second seat of the radially outer ring, axially external with respect to the first seat.

* * * * *